US008995836B2

(12) United States Patent
Cheng et al.

(10) Patent No.: US 8,995,836 B2
(45) Date of Patent: Mar. 31, 2015

(54) PASSIVE OPTICAL NETWORK WITH ADAPTIVE FILTERS FOR UPSTREAM TRANSMISSION MANAGEMENT

(75) Inventors: Ning Cheng, Santa Clara, CA (US); Frank J. Effenberger, Colts Neck, NJ (US); Guo Wei, Shenzhen (CN)

(73) Assignee: Futurewei Technologies, Inc., Plano, TX (US)

( * ) Notice: Subject to any disclaimer, the term of this patent is extended or adjusted under 35 U.S.C. 154(b) by 139 days.

(21) Appl. No.: 13/179,942

(22) Filed: Jul. 11, 2011

(65) Prior Publication Data

US 2012/0014693 A1 Jan. 19, 2012

Related U.S. Application Data

(60) Provisional application No. 61/363,942, filed on Jul. 13, 2010.

(51) Int. Cl.
*H04J 14/00* (2006.01)
*H04B 10/06* (2006.01)
*H04J 14/02* (2006.01)

(52) U.S. Cl.
CPC .................................. *H04J 14/0282* (2013.01)
USPC ................ 398/70; 398/204; 398/66; 398/202

(58) Field of Classification Search
USPC ........... 398/34–35, 66–73, 140, 202–214, 76, 398/100
See application file for complete search history.

(56) References Cited

U.S. PATENT DOCUMENTS 5,115,332 A * 5/1992 Naito et al. ................... 398/202

5,542,010 A * 7/1996 Glance et al. .................. 385/14
(Continued)

FOREIGN PATENT DOCUMENTS

| CN | 101127571 A | 2/2008 |
| CN | 101536536 A | 9/2009 |
| CN | 101635597 A | 1/2010 |

OTHER PUBLICATIONS

Hsueh et al, A Highly Flexible and Efficient Passive Optical Network Employing Dynamic Wavelength Allocation, Journal of Lightwave Technology, vol. 23, No. 1, Jan. 2005, pp. 277-286.*

(Continued)

*Primary Examiner* — Ken Vanderpuye
*Assistant Examiner* — Dibson Sanchez
(74) *Attorney, Agent, or Firm* — Conley Rose, P.C.; Grant Rodolph; Jonathan K. Polk

(57) ABSTRACT

A wavelength division multiplexing passive optical network (WPON) comprising an optical line terminal (OLT) and a plurality of optical network units (ONUs) coupled to the OLT via a power optical splitter. The OLT is configured to monitor wavelengths in use by the ONUs and to divide upstream traffic from the ONUs into multiple channels using tunable filters. Also disclosed is an OLT for a PON, the OLT comprising a plurality of receivers and a plurality of tunable filters corresponding to each of the receivers. The OLT also comprises channel control logic coupled to the tunable filters, wherein the channel control logic is configured to detect a plurality of wavelengths in use for upstream traffic in the PON and to divide the upstream traffic into multiple channels using the tunable filters. Included is a method for managing upstream traffic in a PON, the method comprising monitoring, by a processor, wavelengths in use for upstream traffic in the PON. The method also comprises dividing the upstream traffic into multiple channels using tunable filters.

20 Claims, 8 Drawing Sheets

(56) References Cited

U.S. PATENT DOCUMENTS

| | | | |
|---|---|---|---|
| 6,256,428 B1* | 7/2001 | Norwood et al. | 385/17 |
| 6,388,783 B1* | 5/2002 | Weller-Brophy | 398/82 |
| 6,571,031 B1* | 5/2003 | Augustsson | 385/24 |
| 6,674,937 B1* | 1/2004 | Blair et al. | 385/24 |
| 6,735,358 B2* | 5/2004 | Kitoh et al. | 385/24 |
| 7,099,529 B2* | 8/2006 | Wang et al. | 385/24 |
| 7,136,553 B2* | 11/2006 | Kwon et al. | 385/37 |
| 7,315,575 B2* | 1/2008 | Sun et al. | 375/229 |
| 7,397,979 B2* | 7/2008 | Shpantzer et al. | 385/14 |
| 7,460,793 B2* | 12/2008 | Taylor | 398/208 |
| 7,747,177 B2* | 6/2010 | Chen et al. | 398/206 |
| 7,826,752 B1* | 11/2010 | Zanoni et al. | 398/205 |
| 7,877,013 B2 | 1/2011 | Effenberger | |
| 7,965,950 B2* | 6/2011 | Childers et al. | 398/212 |
| 7,978,975 B2* | 7/2011 | Qian et al. | 398/69 |
| 8,014,685 B2* | 9/2011 | Hoshida | 398/205 |
| 8,306,431 B2* | 11/2012 | Takahara | 398/152 |
| 8,463,121 B2* | 6/2013 | Xu et al. | 398/27 |
| 2003/0026515 A1* | 2/2003 | Barenburg et al. | 385/14 |
| 2004/0013435 A1* | 1/2004 | Eiselt et al. | 398/140 |
| 2005/0158048 A1* | 7/2005 | Sung et al. | 398/66 |
| 2005/0281504 A1* | 12/2005 | Wang et al. | 385/24 |
| 2005/0281558 A1* | 12/2005 | Wang et al. | 398/85 |
| 2006/0115271 A1* | 6/2006 | Hwang et al. | 398/72 |
| 2006/0222364 A1 | 10/2006 | Chung et al. | |
| 2007/0041683 A1* | 2/2007 | Keyworth | 385/24 |
| 2007/0092256 A1* | 4/2007 | Nozue et al. | 398/72 |
| 2008/0019693 A1 | 1/2008 | Sorin | |
| 2008/0031625 A1* | 2/2008 | Okuda et al. | 398/71 |
| 2008/0037990 A1* | 2/2008 | Effenberger | 398/67 |
| 2008/0050119 A1* | 2/2008 | Effenberger | 398/68 |
| 2009/0067838 A1* | 3/2009 | Chen et al. | 398/58 |
| 2009/0142064 A1* | 6/2009 | Taylor | 398/115 |
| 2009/0202245 A1* | 8/2009 | Bouda | 398/76 |
| 2009/0245794 A1* | 10/2009 | Sakharov | 398/79 |
| 2009/0317080 A1* | 12/2009 | Rasztovits-Wiech | 398/35 |
| 2010/0178057 A1* | 7/2010 | Shieh | 398/79 |
| 2010/0232790 A1* | 9/2010 | Ansari et al. | 398/34 |
| 2010/0296819 A1* | 11/2010 | Kahn et al. | 398/158 |
| 2011/0236025 A1* | 9/2011 | Wagner et al. | 398/115 |
| 2011/0262131 A1* | 10/2011 | Gottwald et al. | 398/41 |

OTHER PUBLICATIONS

Charlet, Coherent detection associated with digital signal processing for fiber optics communication, Dec. 2008, Comptes Rendus Physique, vol. 9, pp. 1012-1030.*

Koonen, Fiber to the Home Fiber to the Premises What, Where, and When, May 2006, IEEE, vol. 94, Issue 5, pp. 911-934.*

Foreign Communication From a Related Counterpart Application, International Application No. PCT/CN2011/077092, International Search Report dated Oct. 20, 2011, 4 pages.

Kani, J., et al., "FSAN NG-PON White Paper—Section 1, Draft 3.0," Jan. 14, 2008, 27 pages.

Mukai, et al., "FSAN NG-PON White Paper—Section 2, Draft 4.0," Jan. 14, 2008, 33 pages.

"Draft Standard for Information Technology—Telecommunications and Information Exchange Between Systems—Local and Metropolitan Area Networks—Specific Requirements, Part 3: Carrier Sense Multiple Access with Collision Detection (CSMA/CD) Access Method and Physical Layer Specifications, Amendment: Physical Layer Specifications and Management Parameters for 10 Gb/s Passive Optical Networks," IEEE P802.3av™D2.2, Dec. 3, 2008, 267 pages.

"Series G: Transmission Systems and Media, Digital Systems and Networks, Digital Sections and Digital Line System—Optical Line Systems for Local and Access Networks, 10-Gigabit-capable Passive Optical Network (XG-PON) Systems: Definitions, Abbreviations and Acronyms," ITU-T G.987, Oct. 2010, 26 pages.

* cited by examiner

PASSIVE OPTICAL NETWORK WITH ADAPTIVE FILTERS FOR UPSTREAM TRANSMISSION MANAGEMENT

CROSS-REFERENCE TO RELATED APPLICATIONS

The present application claims priority to U.S. Provisional Patent Application Ser. No. 61/363,942 filed Jul. 13, 2010 by Ning Cheng et. al., and entitled, "Managing Upstream Transmission in Passive Optical Networks with Adaptive Filters," which is incorporated herein by reference as if reproduced in its entirety.

STATEMENT REGARDING FEDERALLY SPONSORED RESEARCH OR DEVELOPMENT

Not applicable.

REFERENCE TO A MICROFICHE APPENDIX

Not applicable.

BACKGROUND

A passive optical network (PON) includes a passive optical power splitter/combiner that feeds individual branching fibers to end users. The PON also has a tree topology that maximizes coverage with minimum network splits, thus reducing optical power loss. In addition, a common fiber feeder part of a PON is shared by all optical network units (ONUs) with terminating branching fibers. Moreover, traffic sent downstream from an optical line terminal (OLT) at a local exchange is simply broadcast by an optical power splitter to every ONU. Sending traffic from an ONU upstream to a local exchange, however, requires accurate multiple access techniques in order to multiplex collision-free traffic generated by the ONUs onto the common feeder fiber.

At least four major categories of multiple access techniques for fiber have been developed. These techniques include: Time Division Multiple Access (TDMA), SubCarrier Multiple Access (SCMA), Wavelength Division Multiple Access (WDMA), and Optical Code Division Multiple Access (OCDMA).

As the user bandwidth demands are ever increasing, PONs with larger bandwidth are required in the future. Common approaches to improve the bandwidth in PONs include higher data rate Time Division Multiplexing (TDM) PONs and Wavelength Division Multiplexing (WDM) passive optical network (WPON) systems in which multiple wavelengths are used. TDM and WDM approaches may be combined as well. As an example, ITU-T has standardized a higher speed TDM PON (ITU-T G.987, XG-PON, which can provide 10 Gigabits per second (Gb/s) downstream and 2.5 Gb/s upstream.

In a WPON network, each ONU uses a wavelength channel to send packets to an OLT at a local exchange. In addition, the wavelength channel constitutes an independent communication channel and may carry a different signal format from other wavelength channels carried by other ONUs connecting to the OLT.

Conventionally, a WPON network is designed to make each hardware unit at each endpoint, as well as each wavelength selective multiplexing element in the network, tune to a unique wavelength. This design works for wavelength independent power splitting PONs. However, a network with such a design is difficult to manage and prone to errors. One of conventional ways to improve performance of such a design is to implement "colorless" end-point equipment. In a colorless WPON network, an ONU has no intrinsic channel assignment. The ONU obtains a channel assignment by virtue of what fiber the ONU is attached to on the network. This typically assumes that the network uses a WDM device as a splitting element. The physical effects used in this type of network design are either injection locking of a broadband laser source, or reflective modulation of downstream light.

A prominent feature in GPON and XG-PON systems is the bandwidth asymmetry for upstream and downstream transmission. However, future multimedia applications such as video conference and point-to-point (P2P) streaming may require symmetric bandwidth for downstream and upstream. A simple way to improve the upstream bandwidth is to use higher transmission rates. For example, 10 G PON (IEEE 802.3av) uses 10 Gb/s upstream transmission. However, an ONU with a higher transmission rate requires a more expensive transmitter. An alternative approach is to use WDM to improve the upstream bandwidth. That is, ONUs may transmit upstream signals with different wavelengths while the OLT uses multiple receivers to recover the upstream data. For this scheme, the cost increase for ONUs is smaller, but service providers would have to keep track of different ONUs with different wavelengths, and ONUs may need temperature control to keep their wavelengths stable. There is an ongoing need to develop WDM schemes that operate over a power splitting PON infrastructure that does not require wavelength selected ONUs.

SUMMARY

In one embodiment, the disclosure includes a wavelength division multiplexing passive optical network (WPON) comprising an optical line terminal (OLT) and a plurality of optical network units (ONUs) coupled to the OLT via a power optical splitter. The OLT is configured to monitor wavelengths in use by the ONUs and to divide upstream traffic from the ONUs into multiple channels using tunable filters.

In another embodiment, the disclosure includes an OLT for a PON, the OLT comprising a plurality of receivers and a plurality of tunable filters corresponding to each of the receivers. The OLT also comprises channel control logic coupled to the tunable filters, wherein the channel control logic is configured to detect a plurality of wavelengths in use for upstream traffic in the PON and to divide the upstream traffic into multiple channels using the tunable filters.

In yet another embodiment, the disclosure includes a method for managing upstream traffic in a PON, the method comprising monitoring, by a processor, wavelengths in use for upstream traffic in the PON; wherein the wavelengths are used for sending traffic from a plurality of optical network units (ONUs) to one optical line terminal (OLT), dividing the upstream traffic into multiple channels using multiple tunable filters; wherein each of the multiple tunable filters corresponds to a different passband of multiple passbands, and each of the multiple tunable filters is configured to pass traffic the wavelength of which falls into the corresponding passband, and sending, by the multiple tunable filters, the divided upstream traffic to multiple receivers through the multiple channels, wherein each one receiver of the multiple receivers corresponds to one channel of the multiple channels.

These and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken

DETAILED DESCRIPTION

It should be understood at the outset that although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

Disclosed herein is a system and apparatus for managing upstream transmissions in a passive optical network (PON) with adaptive (tunable) filters. Without limitation, the placement and control of tunable filters for managing upstream transmissions may be, for example, at the optical line terminal (OLT). The use of tunable filters as described herein reduces the overall cost of a PON since random wavelength distribution for ONU transmitters is possible (i.e., expensive tunable lasers can be avoided). The random distribution of wavelengths is due to each ONU having a different wavelength due to different laser characteristics (e.g., cavity length and grating pitches) and different operating conditions (e.g., driving current and temperature). Based on the wavelength distributions on ONUs, tunable filters with suitable bandwidth and appropriate center wavelength can be used to divide ONUs into N groups with each group having roughly an equal number of ONUs. The tunable filter operation can be either optical or electrical as disclosed herein. The tunable filters described herein can be added as an upgrade to an existing PON architecture to enhance upstream transmission rates. In operation, the tunable filters are controlled to select the channels to which upstream traffic is divided. In at least some embodiments, the tunable filters are dynamically controlled to provide load balancing of upstream traffic based on bandwidth demand. Accordingly, the total bandwidth for upstream traffic can be improved to N times of the ONU transmission rate.

The disclosed embodiments may enable the fabrication or manufacture of PONs with improved upstream bandwidth. For example, this disclosure may increase the upstream bandwidth of XG-PON from 2.5 Gb/s to 10 Gb/s without changing XG-PON ONUs. The disclosed embodiments may enable its system providers to utilize ONUs with higher transmission rates or utilize ONUs with different but fixed wavelengths.

Figure 1:
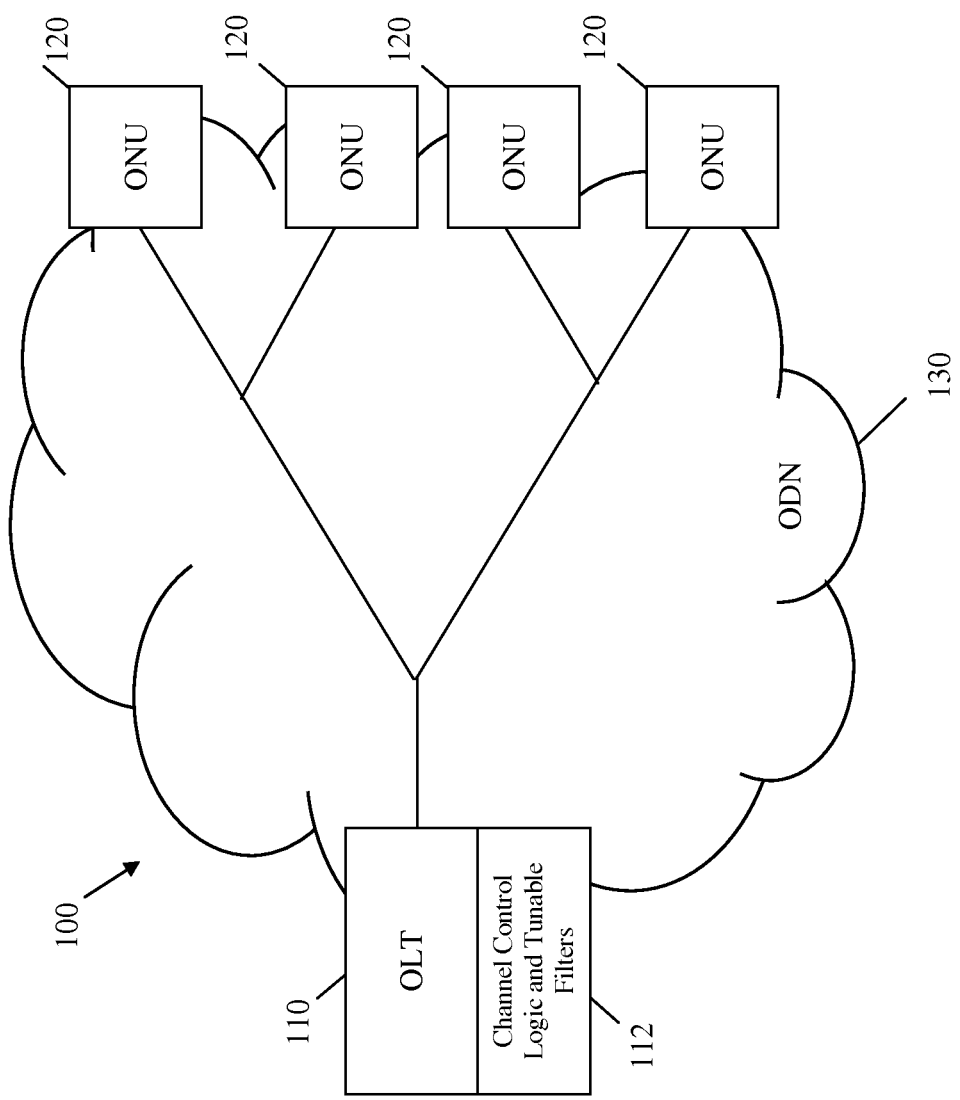
FIG. 1 is a schematic diagram of an embodiment of a PON system.

FIG. 1 is a schematic diagram of an embodiment of a PON system 100. The PON 100 comprises an OLT 110, a plurality of ONUs 120, and an ODN 130. The PON 100 is a communications network that does not require any active components to distribute data between the OLT 110 and the ONUs 120. Instead, the PON 100 uses the passive optical components in the ODN 130 to distribute data between the OLT 110 and the ONUs 120. Examples of suitable PONs 100 include the asynchronous transfer mode PON (APON) and the broadband PON (BPON) defined by the ITU-T G.983 standard, the Gigabit PON (GPON) defined by the ITU-T G.984 standard, the Ethernet PON (EPON) defined by the IEEE 802.3ah standard, and the wavelength division multiplexing PON (WPON), all of which are incorporated by reference as if reproduced in their entirety.

One component of the PON 100 may be the OLT 110. The OLT 110 may be any device that is configured to communicate with the ONUs 120 and another network (not shown). Specifically, the OLT 110 may act as an intermediary between the other network and the ONUs 120. For instance, the OLT 110 may forward data received from the network to the ONUs 120, and forward data received from the ONUs 120 onto the other network. Although the specific configuration of the OLT 110 may vary depending on the type of PON 100, in an embodiment, the OLT 110 may comprise channel control logic and tunable filters, as explained in detail below. When the other network is using a protocol, such as Ethernet or Synchronous Optical Networking (SONET)/Synchronous Digital Hierarchy (SDH), that is different from the communications protocol used in the PON 100, the OLT 110 may comprise a converter that converts the other network's data into the PON's protocol. The OLT 110 converter may also convert the PON's data into the other network's protocol. The OLT 110 described herein is typically located at a central location, such as a central office, but may be located at other locations as well.

Another component of the PON 100 may be the ONUs 120. The ONUs 120 may be any devices that are configured to communicate with the OLT 110 and a customer or user (not shown). Specifically, the ONUs may act as an intermediary between the OLT 110 and the customer. For instance, the ONUs 120 may forward data received from the OLT 110 to the customer, and forward data received from the customer onto the OLT 110. Although the specific configuration of the ONUs 120 may vary depending on the type of PON 100, in an embodiment, the ONUs 120 may comprise an optical transmitter configured to send optical signals to the OLT 110. Additionally, the ONUs 120 may comprise an optical receiver configured to receive optical signals from the OLT 110 and a converter that converts the optical signal into electrical signals for the customer, such as signals in the Asynchronous Transfer Mode (ATM) or Ethernet protocol. The ONUs 120 may also comprise a second transmitter and/or receiver that may send and/or receive the electrical signals to a customer device. In some embodiments, ONUs 120 and optical network terminals (ONTs) are similar, and thus the terms are used interchangeably herein. The ONUs are typically located at distributed locations, such as the customer premises, but may be located at other locations as well.

Another component of the PON 100 may be the ODN 130. The ODN 130 is a data distribution system that may comprise optical fiber cables, couplers, splitters, distributors, and/or other equipment. In an embodiment, the optical fiber cables, couplers, splitters, distributors, and/or other equipment are passive optical components. Specifically, the optical fiber cables, couplers, splitters, distributors, and/or other equipment may be components that do not require any power to distribute data signals between the OLT 110 and the ONUs 120. The ODN 130 typically extends from the OLT 110 to the ONUs 120 in a branching configuration as shown in FIG. 1, but may be alternatively configured as determined by a person of ordinary skill in the art.

In at least some embodiments, the PON 100 described herein may transmit upstream traffic from ONUs 120 to OLT 110 via ODN 130. At the OLT 110, channel selection logic monitors the wavelengths corresponding to the upstream traffic and divides the upstream traffic into channels using tunable filters 112. For example, the channel selection logic may dynamically adjust the channels corresponding to the tunable filters 112 to provide load balancing based on bandwidth demand over time. The tunable filters 112 used in the disclosed technique may be, for example, tunable edge filters and/or bandpass filters. Such tunable filters 112 may be implemented in a cascading arrangement as described herein. Even if the wavelength distribution for the ONUs 120 is random (as is usually the case due to variations in the ONU lasers used for upstream transmissions), the channel selection logic is able to control the tunable filters 112 so that upstream transmission wavelengths are divided approximately equally across a plurality of channels. The ONU lasers may comprise, for example, distributed feedback (DFB) lasers with a very narrow tuning range (e.g., less than 1 nm). Additionally or alternatively, the ONU lasers may comprise at least some DFB lasers with no tuning.

Figure 2:
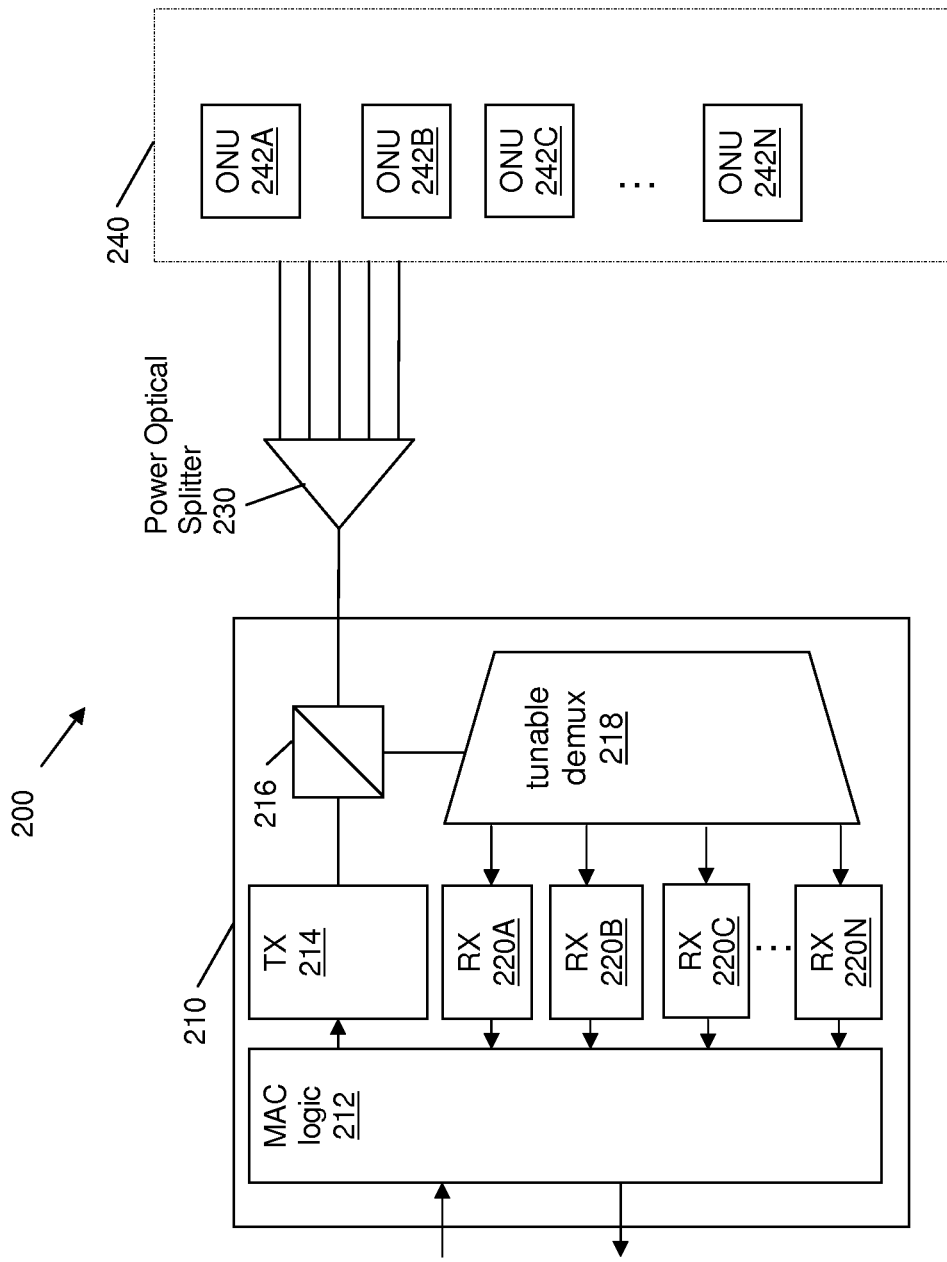
FIG. 2 is a WDM based PON (WPON) system according to the present invention.

FIG. 2 is a WDM based PON (WPON) system 200 according to the present invention. As shown, network 200 includes an OLT 210, a power optical splitter 230, and an ONU group 240, including ONUs 242A-242N. In at least some embodiments, the ONUs 242A-242N connect to the power optical splitter 230 via optical fibers and the power optical splitter 230 connects to OLT 210 via another optical fiber. As shown, the OLT 210 comprises a media access control (MAC) logic unit 212 and a downstream transmitter 214, which operate to transmit data traffic downstream as needed via diplexer 216. The OLT 210 also comprises a plurality of receivers 220A-220N and a tunable demultiplexer (demux) 218, which operate to handle upstream traffic received from the ONU group 240 via the diplexer 216. A person of ordinary skill in the art will understand that downstream signals may be served by N WDM channels, and upstream signals may be served by M WDM channels. Both N and M can be any small integer. In addition, the OLT 210 may possess N downstream transmitters and M upstream receivers. However, each ONU in ONU group 240 may contain only one downstream receiver and one upstream transmitter.

In conventional designs, wavelength assignment to an ONU is fixed by virtue of the design—that is, each unit operates on a particular pair of channels that can not be changed. In addition, each downstream channel uses a multiplexing scheme such that multiple ONUs can share the downstream channel. Moreover, each upstream channel uses a multiplexing scheme such that multiple ONUs can share the upstream channel. There are several such schemes that are based on TDMA or CDMA schemes, including ITU B-PON (G.983.x), ITU G-PON (G.984.x), and IEEE 802.3ah systems. These schemes are based on multiple identical ONUs sharing a channel and being coordinated and configured automatically under stored program control.

In accordance with at least some embodiments, the disclosed WPON architecture provides tunable channel assignments for upstream traffic received from the ONU group 240. For the WPON system 200 of FIG. 2, such tunable channel assignments are controlled by the tunable demux 218. Consider, for example, a Gigabit PON (G-PON) based network, where a non-WDM system supports 64 ONUs per PON, using the 1480 to 1580 nanometers (nm) band for downstream communications and the 1260 to 1360 nm band for upstream communications. Using a conventional coarse WDM (CWDM) grid of wavelengths, it is possible to construct economical transceivers that use 20 nm spaced wavelength channels. Therefore, if the existing 100 nm wavelength bands are divided into five 20 nm bands, a network according to the present invention may be implemented where downstream channels may equal upstream channels (N=M=5). On average, each channel pair may have assigned thereto approximately 13 ONUs (64/5). In practice, PONs are usually not loaded to ultimate capacity. Even in rare cases when a channel pair becomes overloaded, the only consequence may be marginally lower performance for the ONUs in the crowded channel pair, and this will probably not cause a failure of service.

In one embodiment, the present invention provides an arrangement wherein each downstream channel may associate with a single upstream channel. In this embodiment, the number of channel pairs may be equal to the number of downstream channels. In another embodiment, the present invention provides ONUs that have random pairings of upstream and downstream assignments. This additional randomization may require the OLT 210 to manage an entire multi-PON system, but reduces the chance of having less capacity in both directions in the system.

For the WPON system 200, the tunable demux 218 provides tunable wavelength bands (e.g., based on a combination of stopbands and passbands) for handling signal transmission. In downstream communication, a conventional design may be used. However, in upstream communication, the disclosed embodiments enable each ONU to transmit at virtually any wavelength. Therefore, the need to select ONU lasers that fall into specific wavelength bands is eliminated.

Figure 3:
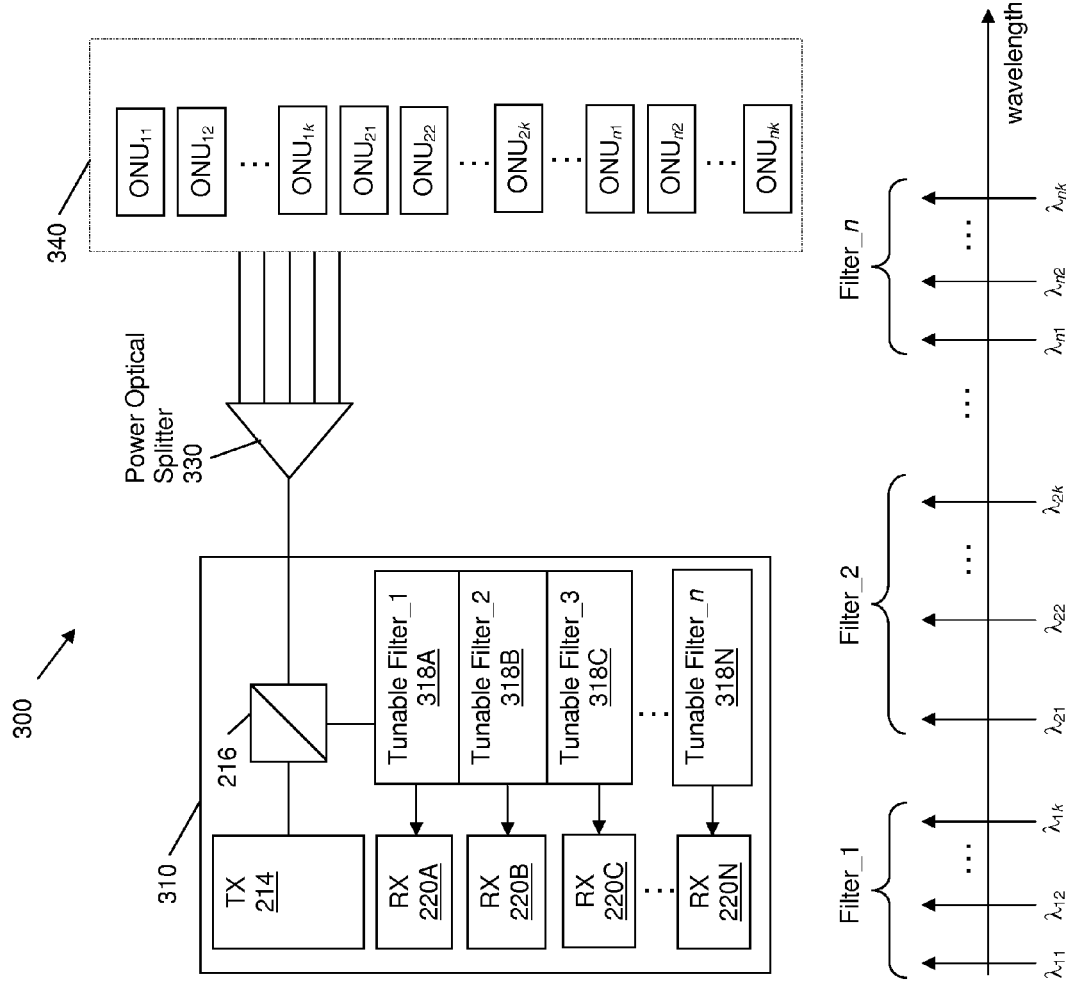
FIG. 3 depicts channel selection for a WPON system according to the present invention.

FIG. 3 depicts channel selection for a WPON system 300 according to the present invention. As shown, WPON system 300 includes an OLT 310, a power optical splitter 330, and an ONU group 340 with a plurality of ONUs (labeled $ONU_{11}$ to $ONU_{nk}$). The ONUs in ONU group 340 connect to power optical splitter 330 via optical fibers and the power optical splitter 330 connects to OLT 310 via another optical fiber. As shown, the OLT 310 comprises a downstream transmitter 214, which operates to transmit data traffic downstream as needed via diplexer 216. The OLT 310 also comprises a plurality of receivers 220A-220N coupled to corresponding tunable filters 318A-318N, which operate to handle upstream traffic received from the ONU group 340 via the diplexer 216, which separate the upstream and downstream wavelengths.

In accordance with at least some embodiments, the tunable filters 318A-318N are adaptive such that the wavelengths corresponding to $ONU_{11}$ to $ONU_{nk}$ in ONU group 340 are divided into a plurality of channels. In the example of WPON system 300, tunable filter_1 318A is assigned wavelengths $\lambda_{11}$-$\lambda_{1k}$ corresponding to $ONU_{11}$ to $ONU_{1k}$, filter_2 318B is assigned wavelengths $\lambda_{21}$-$\lambda_{2k}$ corresponding to $ONU_{21}$ to $ONU_{2k}$, and so on. Note the ONU notation ($ONU_{11}$ to $ONU_{nk}$) in FIG. 3 is used to describe an assignment of ONUs transmitting at particular wavelengths to tunable filters 318A-318N and is not intended to describe a permanent ONU arrangement or tunable filter arrangement. In other words, the ONUs transmitting at the wavelengths $\lambda_{11}$-$\lambda_{nk}$ may change over time. Further, the wavelength range corresponding to each of the tunable filters 318A-318N may be adjusted as needed to maintain equal distribution of wavelengths across available tunable filters.

In accordance with at least some embodiments, the wavelengths in use by the ONUs of WPON system 300 are monitored by the OLT 310 and the upstream traffic from the ONUs of ONU group 340 is divided into multiple channels using tunable filters 318A-318N. For example, the OLT 310 may dynamically adjust the tunable filters 318A-318N so that each channel has approximately the same amount of wavelengths assigned thereto. Further, the channels corresponding to the tunable filters 318A-318N may be dynamically adjusted to provide load balancing based on bandwidth demand. It should be understood that the wavelength range associated with each tunable filter 318A-318N may be different and may vary over time.

Figure 4:
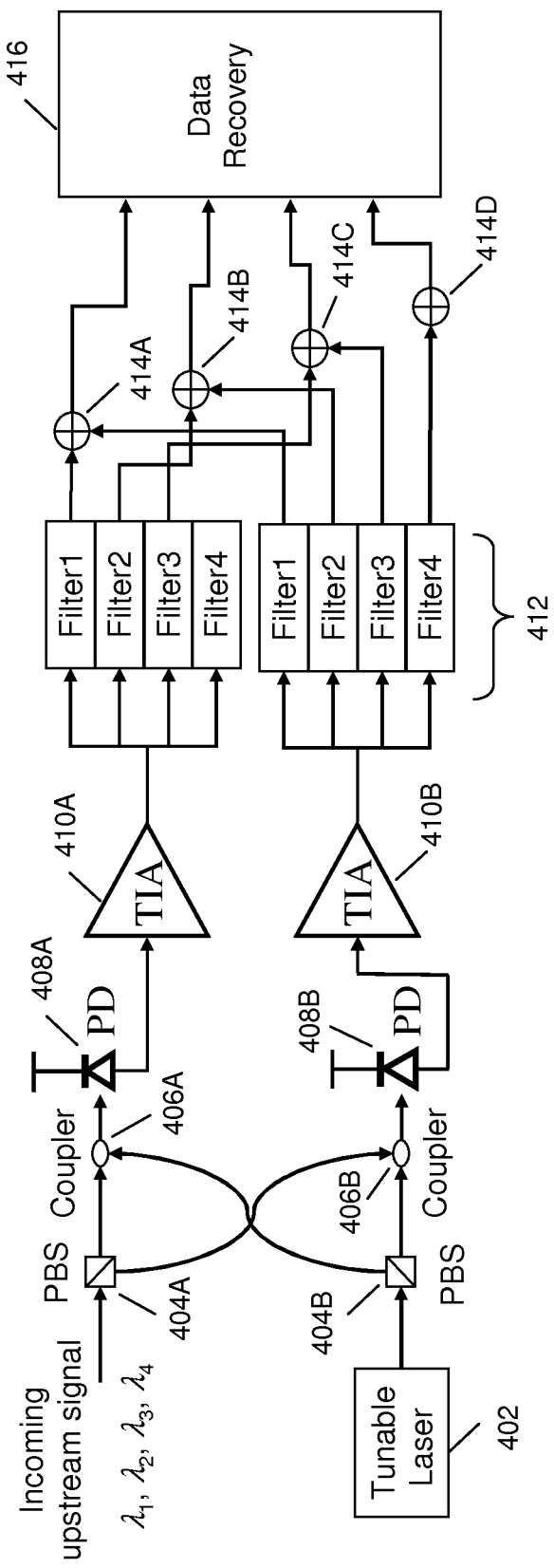
FIG. 4 illustrates coherent detection and tunable filtering to divide upstream transmission into multiple wavelength channels according to the present invention

FIG. 4 illustrates coherent detection and tunable filtering to divide upstream transmission into multiple wavelength channels. When ONU wavelengths in PONs spread across a wide wavelength range (e.g., 10 nanometers (nm)), tunable optical filters can provide enough wavelength resolutions to divide upstream transmission into a number of wavelength channels. However, if the ONU wavelengths are tightly distributed within a narrow range (e.g. 0.5 nm), tunable optical filters might not have a sharp transition edge (between passband and stopband) or may not be able to tune within a certain accuracy to separate upstream transmission in wavelength channels, that is, all the ONU wavelengths might fall within a wavelength channel. In such case, electrical filters may provide a better wavelength resolution. In order to take advantage of the high resolution electrical filter, a tunable laser with its wavelength tuned in the proximity of the ONU wavelengths will be used in a down converter. The output of the tunable laser will mix with the upstream signal, which is then received by a polarization diversity optical receiver. As long as the frequency difference between the upstream signals and the tunable laser are within the receiver bandwidth, the upstream signal can be recovered. If a number of electrical filters are used in the receiver, upstream signals with different wavelengths can be resolved electrically.

In FIG. 4, arrangement 400 shows four upstream signals with different wavelengths $\lambda_1, \lambda_2, \lambda_3, \lambda_4$ being mixed with the output of a tunable laser 402 having wavelength $\lambda_{LO}$. The polarization beam splitters 404A divides the signal into two perpendicular polarizations, and the polarization beam splitters 404B divides the output of the tunable laser into two perpendicular polarizations with equal power. Then the signal and tunable laser output are mixed through optical coupler 406A and 406B. The output of the photodetectors 408A and 408B will include four signals around different frequencies $|c_0/\lambda_{LO} - c_0/\lambda_1|$, $|c_0/\lambda_{LO} - c_0/\lambda_2|$, $|c_0/\lambda_{LO} - c_0/\lambda_3|$ and $|c_0/\lambda_{LO} - c_0/\lambda_4|$. These signals with different frequencies are first amplified by transimpedance amplifiers 410A and 410B, and then separated by tunable electrical filters 412 with proper central frequencies and bandwidths. The output of electrical filters 412 are added together by adders 414A, 414B, 414C and 414D. Then the added signals are sent to data recovery logic 416 to recover the data sent from ONUs. The data receiver logic 416 may be implemented with digital signal processing or analog signal processing.

The optical and electrical tunable filters described herein can be combined together to cover a wide wavelength range and provide high wavelength resolutions. For example, assume ONU wavelengths are distributed across 8 nm. Seven tunable edge filters can be used to separate upstream into 8 wavelength channels. Depending on the ONU wavelength distribution, some of the 8 wavelength channels may have a narrow bandwidth (e.g., 0.5 nm), but a large number of ONUs may fall within this narrow bandwidth. Then, a tunable laser (e.g., tunable laser 402) can be tuned to the center of this wavelength band, and its output will be mixed with the upstream signals in this band. After photodetection (e.g., by photodetectors 408A and 408B), electrical filters (e.g., by filters 412) will divide this wavelength band into a number of sub-bands.

Figure 5:
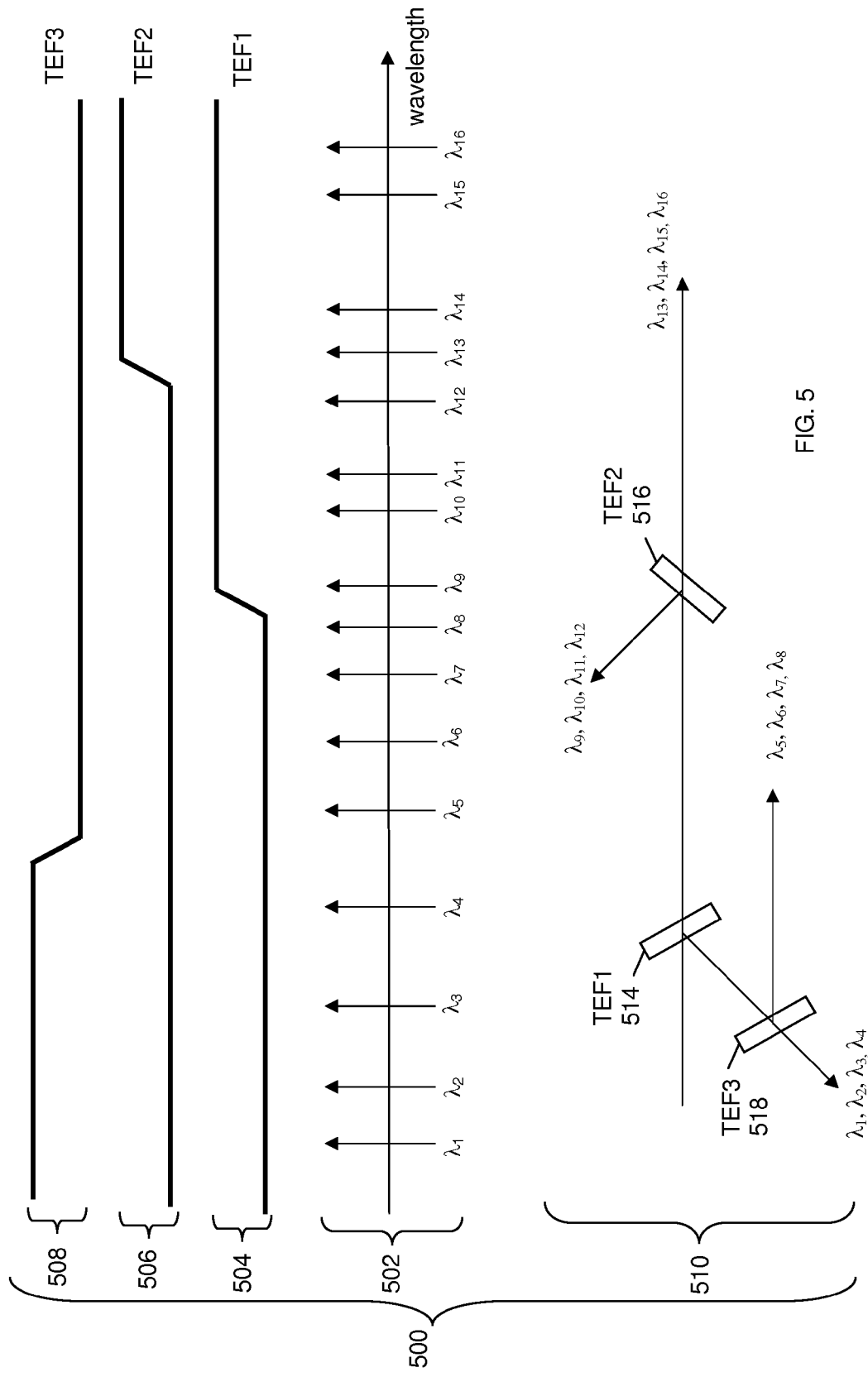
FIG. 5 depicts use of tunable edge filters to divide wavelengths among a plurality of channels according to the present invention.

FIG. 5 depicts use of tunable edge filters (TEFs) to divide wavelengths among a plurality of channels according to the present invention. In FIG. 5, illustration 500 includes a random distribution of wavelengths chart 502, filter transmission charts 504, 506, and 508, and a cascading TEF chart 510 to illustrate how a random distribution of wavelengths (labeled $\lambda_1$-$\lambda_{16}$) corresponding to upstream traffic from ONUs is divided into four channels using three tunable edge filters— TEF1 514, TEF2 516, and TEF3 518. An edge filter such as TEF1 514, TEF2 516, and TEF3 518 can be implemented with multilayers of thin films, and its tuning can be achieved by varying its tilting angle or temperature. First, tunable edge filter TEF1 separate ONUs into two groups of equal numbers, that is, two wavelength channels with one wavelength channel coming out from the thru port and the other from the reflection port. Then two additional edge filters (TEF2 and TEF3) following TEF1 will divide ONUs into four subgroups (four wavelength channels).

As shown in filter transmission chart 504, TEF1 514 is configured to transition from stopband to passband between $\lambda_8$ and $\lambda_9$ of the random distribution of wavelengths chart 502. Thus, as shown in cascading TEF chart 510, TEF1 514 divides $\lambda_1$-$\lambda_{16}$ into two groups of equal numbers ($\lambda_1$-$\lambda_8$ and $\lambda_9$-$\lambda_{16}$), that is, two wavelength channels with one wavelength channel coming out from the thru port and the other from the reflection port of TEF1 514. Meanwhile, as shown in filter transmission chart 506, TEF2 516 is configured to transition from stopband to passband between $\lambda_{12}$ and $\lambda_{13}$ of the random distribution of wavelengths chart 502. Thus, as shown in cascading TEF chart 510, TEF2 516 divides grouping $\lambda_9$-$\lambda_{16}$ into two smaller groups: $\lambda_9$-$\lambda_{12}$ and $\lambda_{13}$-$\lambda_{16}$. Meanwhile, as shown in filter transmission chart 508, TEF3 518 is configured to transition from passband to stopband between $\lambda_4$ and $\lambda_5$ of the random distribution of wavelengths chart 502. Thus, TEF3 518 divides grouping $\lambda_1$-$\lambda_9$ into two smaller groups: $\lambda_1$-$\lambda_4$ and $\lambda_5$-$\lambda_8$. By cascading the tunable edge filters TEF1 514, TEF2 516, and TEF3 518, a random distribution of wavelengths (e.g., $\lambda_1$-$\lambda_{16}$) is evenly divided into four channels.

The number of channels, of course, is not limited to any particular number. In general, cascading $2^N-1$ tunable edge filters can divide the upstream transmission into $2^N$ wavelength channels. To divide ONUs equally into those wavelength channels, each tunable edge filter has to be tuned individually based on ONU wavelength distribution. Initially, a tunable edge filter can be used to scan across the whole upstream wavelength band, so that ONU wavelength distribution can be determined. Once ONU wavelength distribution is known, each tunable edge filter can be tuned to correct wavelength. Even if more or less wavelengths are used for upstream transmissions over time, tunable edge filters can be controlled to evenly divide the wavelengths across the available channels.

Figure 6:
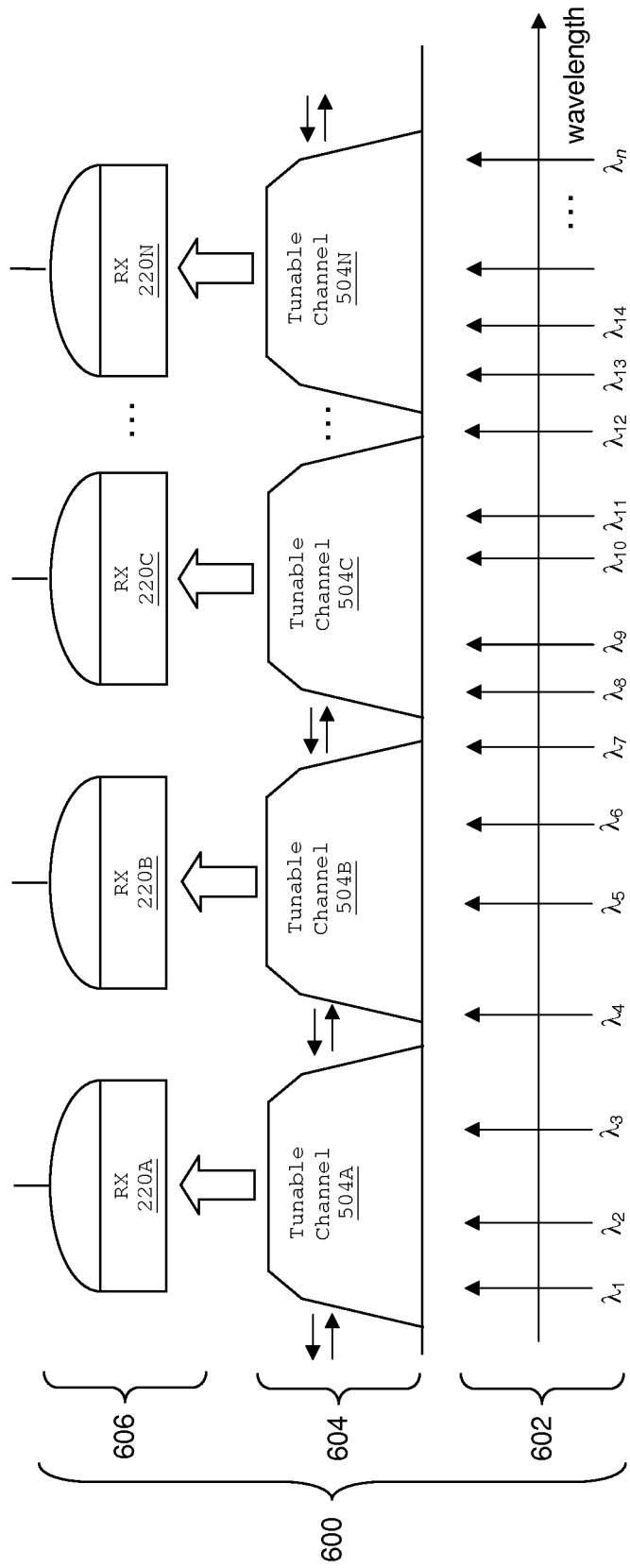
FIG. 6 depicts use of tunable channels to direct upstream traffic to receivers in a WPON system according to the present invention.

FIG. 6 depicts use of tunable channels to direct upstream traffic to receivers in a WPON system according to the present invention. In FIG. 6, illustration 600 includes a random distribution of wavelengths chart 602, a tunable channel arrangement 604, and a receiver arrangement 606 to illustrate dividing a random distribution of wavelengths (labeled $\lambda_1$-$\lambda_n$)

corresponding to upstream traffic from ONUs into a plurality of channels 604A-604N corresponding to receivers 220A-220N. The division of wavelengths may be accomplished, for example, by an arrangement of tunable edge filters and/or bandpass filters. Over time, the wavelengths represented in the random distribution of wavelengths chart 602 may vary in position and quantity. Accordingly, the wavelength range corresponding to each tunable channel 604A-604N may vary as well. In at least some embodiments, the channels 604A-604N are selected so that each has approximately the same amount of wavelengths assigned thereto. Further, the channels 604A-604N may be dynamically adjusted to provide load balancing based on bandwidth demand. It should be understood that the wavelength range associated with each of the channels 604A-604N may be different and may vary over time to accommodate random distribution of wavelengths for ONU transmissions.

In the tunable filter scheme disclosed herein, discovery of ONU wavelengths enable selection and adjustment of channels to ensure proper signal transmission from each ONU to the OLT. For example, at an initial time (T=0) and at a later time (T=later), ONU wavelength discovery may occur. When ONUs are first connected (T=0) to the network and activated, the ONUs begin to transmit signals during special intervals of time specifically reserved for the OLT to discover ONUs. At this time, the OLT may inspect the wavelengths in use for upstream transmissions and provisionally assign ONUs to different channels corresponding to different tunable filters. Over time, the ONUs wavelengths might drift, and be carried into either a channel edge, or into an adjacent channel. At a later time (T=later), ONU wavelength discovery is repeated. If the number of wavelengths in use for upstream transmissions has increased or decreased, the tunable filters are adjusted so that each tunable filter has approximately the same number of wavelengths assigned thereto. Similarly, if wavelengths in use for upstream transmissions drift from their channel assignments, the tunable filters are adjusted as needed so that each tunable filter has approximately the same number of wavelengths assigned thereto. Further, if the number of tunable filters and/or channels increases or decreases over time, the tunable filters are adjusted as needed so that each tunable filter has approximately the same number of wavelengths assigned thereto. In this manner, upgradeable and flexible channel selection is provided. The tunable filter arrangement can be employed, for example, with PONs where upstream traffic from ONUs corresponds to a random distribution of wavelengths and to PONs where bandwidth demand varies over time.

Figure 7:
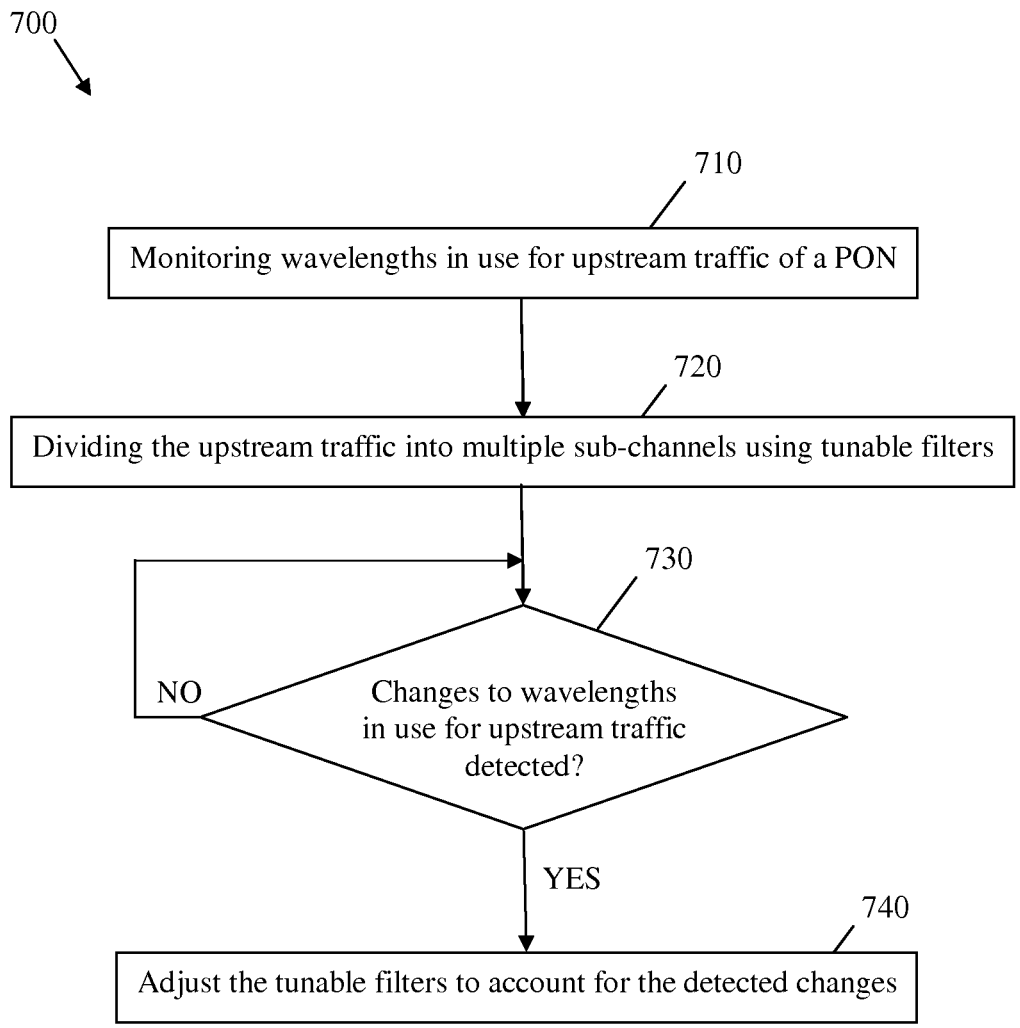
FIG. 7 illustrates a method for controlling channel selection in a WPON system according to the present invention.

FIG. 7 illustrates a method 700 for controlling channel selection in a WPON system according to the present invention. The method 700 may be implemented, for example, by channel selection logic of an OLT or any other component of the PON 100. As shown, the method 700 comprises monitoring wavelengths in use for upstream traffic of a PON (block 710). The monitoring step of block 710 may detect, for example, a random distribution of wavelengths for the upstream traffic. At block 720, the upstream traffic is divided into multiple channels using tunable filters. The dividing step of block 720 may comprise controlling tunable edge filters to divide the upstream traffic into multiple channels. Further, the dividing step of block 720 may comprise dynamically selecting the channels to provide load balancing based on bandwidth demand. Further, the dividing step of block 720 may comprise dynamically adjusting the tunable filters so that each channel has approximately the same amount of wavelengths assigned thereto.

If changes to wavelengths in use for upstream traffic are detected (determination block 730), the tunable filters are adjusted to account for the detected changes (block 740). The detected changes include, for example, the quantity and value of wavelengths in use for ONU upstream traffic. The method 700 may be repeated as needed to dynamically handle upstream traffic in a PON. Further, the method 700 may be adapted to account for an increased number of tunable filters to support a higher bandwidth for upstream traffic in a PON.

Figure 8:
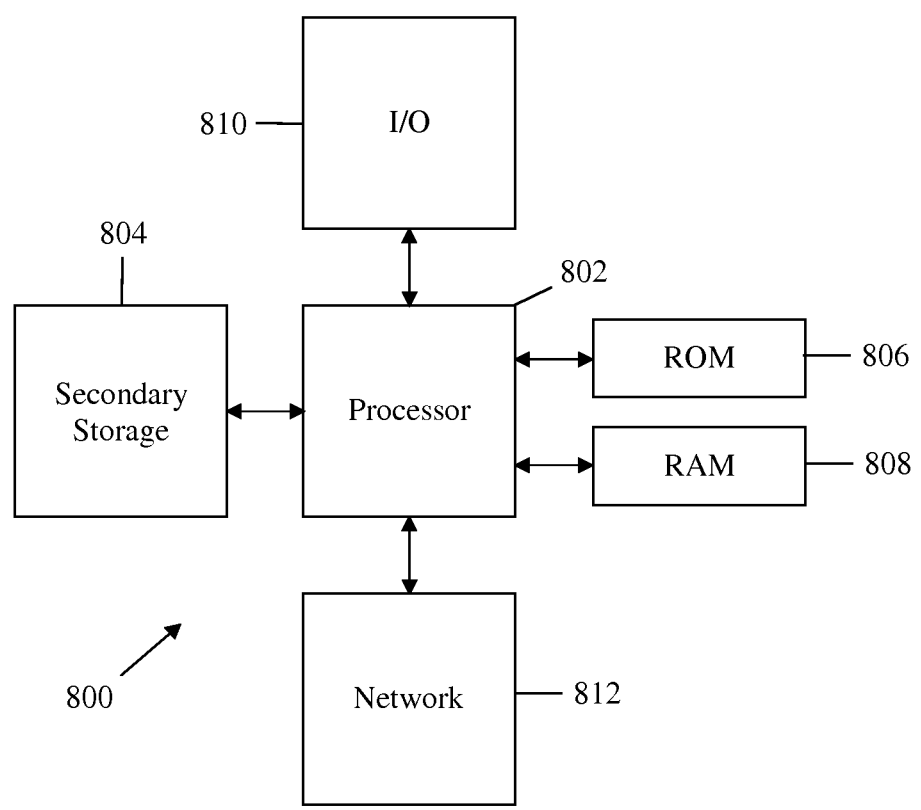
FIG. 8 is a schematic diagram of one embodiment of a general-purpose computer system.

The network components described above may be implemented on any general-purpose network component, such as a computer or network component with sufficient processing power, memory resources, and network throughput capability to handle the necessary workload placed upon it. FIG. 8 illustrates a typical, general-purpose network component suitable for implementing one or more embodiments of a node disclosed herein. The network component 800 includes a processor 802 (which may be referred to as a central processor unit or CPU) that is in communication with memory devices including secondary storage 804, read only memory (ROM) 806, random access memory (RAM) 808, input/output (I/O) devices 810, and network connectivity devices 812. The processor may be implemented as one or more CPU chips, or may be part of one or more application specific integrated circuits (ASICs).

The secondary storage 804 is typically comprised of one or more disk drives or tape drives and is used for non-volatile storage of data and as an over-flow data storage device if RAM 808 is not large enough to hold all working data. Secondary storage 804 may be used to store programs that are loaded into RAM 808 when such programs are selected for execution. The ROM 806 is used to store instructions and perhaps data that are read during program execution. ROM 806 is a non-volatile memory device that typically has a small memory capacity relative to the larger memory capacity of secondary storage. The RAM 808 is used to store volatile data and perhaps to store instructions. Access to both ROM 806 and RAM 808 is typically faster than to secondary storage 804.

While several embodiments have been provided in the present disclosure, it should be understood that the disclosed systems and methods might be embodied in many other specific forms without departing from the spirit or scope of the present disclosure. For example, the tunable filter technique disclosed herein can be combined with TDM techniques as needed. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

At least one embodiment is disclosed and variations, combinations, and/or modifications of the embodiment(s) and/or features of the embodiment(s) made by a person having ordinary skill in the art are within the scope of the disclosure.

Alternative embodiments that result from combining, integrating, and/or omitting features of the embodiment(s) are also within the scope of the disclosure. Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). For example, whenever a numerical range with a lower limit, $R_l$, and an upper limit, $R_u$, is disclosed, any number falling within the range is specifically disclosed. In particular, the following numbers within the range are specifically disclosed: $R=R_l+k*(R_u-R_l)$, wherein k is a variable ranging from 1 percent to 100 percent with a 1 percent increment, e.g., k is 1 percent, 2 percent, 3 percent, 4 percent, 5 percent, ... 50 percent, 51 percent, 52 percent, ..., 95 percent, 96 percent, 97 percent, 98 percent, 99 percent, or 100 percent. Moreover, any numerical range defined by two R numbers as defined in the above is also specifically disclosed. Use of broader terms such as comprises, includes, and having should be understood to provide support for narrower terms such as consisting of, consisting essentially of, and comprised substantially of. All documents described herein are incorporated herein by reference.

What is claimed is:

1. A wavelength division multiplexing based passive optical network (WPON), the WPON comprising:
    an optical line terminal (OLT) comprising:
        tunable electrical filters;
        a first polarization beam splitter (PBS) coupled to the tunable electrical filters and configured to receive upstream traffic;
        a tunable laser; and
        a second PBS directly coupled to the tunable laser; and
    a plurality of optical network units (ONUs) coupled to the OLT via a power optical splitter,
    wherein the OLT is configured to monitor frequencies in use by the ONUs and to divide the upstream traffic from the ONUs into multiple channels using the tunable electrical filters,
    wherein the OLT is configured to mix a plurality of wavelengths with a local reference signal prior to the tunable electrical filters,
        wherein the wavelengths are associated with the frequencies,
        wherein the OLT is configured to dynamically adjust the tunable electrical filters so that each channel has approximately a same number of frequencies assigned thereto,
        wherein each channel comprises a range of frequencies, and
        wherein the ranges of frequencies do not overlap.

2. The WPON of claim 1, wherein frequency distribution for the ONUs is random, wherein each of the frequencies used by the ONUs comprises two polarizations, and wherein the two polarizations are recombined after separately passing through the tunable electrical filters and forwarded together for further signal processing.

3. The WPON of claim 2, wherein the channels corresponding to the tunable electrical filters are dynamically adjusted to provide load balancing based on bandwidth demand, and wherein the two polarizations are separately converted into an electrical domain prior to passing through the tunable electrical filters.

4. The WPON of claim 1, wherein each ONU comprises a distributed feedback (DFB) laser with no tuning or with narrow tuning less than 1 nanometer (nm).

5. The WPON of claim 1, wherein the tunable electrical filters may be dynamically adjusted based upon the frequency monitoring without the use of stored filter adjustment values.

6. An optical line terminal (OLT) comprising:
    a plurality of receivers;
    a plurality of tunable electrical filters corresponding to each of the receivers;
    a first polarization beam splitter (PBS) coupled to the tunable electrical filters and configured to receive upstream traffic;
    a laser coupled to the tunable electrical filters and configured to output a local reference signal;
    a second PBS directly coupled to the laser; and
    channel control logic coupled to the tunable electrical filters,
    wherein the channel control logic is configured to detect a plurality of frequencies in use for the upstream traffic and to divide the upstream traffic into multiple channels using the tunable electrical filters,
    wherein a plurality of wavelengths associated with the frequencies is mixed with the reference signal prior to passing through the tunable electrical filters,
    wherein the channel control logic is configured to dynamically adjust the tunable electrical filters so that each channel has approximately a same number of frequencies assigned thereto,
    wherein each channel comprises a range of frequencies, and
    wherein the ranges of frequencies do not overlap.

7. The OLT of claim 6, wherein the second PBS is configured to forward a first portion of the reference signal to a first coupler and a second portion of the reference signal to a second coupler, and wherein the channel control logic is configured to detect a random distribution of frequencies for the upstream traffic.

8. The OLT of claim 7, further comprising a second photodetector positioned between the second PBS and the tunable electrical filters and a second transimpedance amplifier positioned between the second photodetector and the tunable electrical filters, wherein the channel control logic dynamically selects the channels to provide load balancing based on bandwidth demand.

9. The OLT of claim 8, further comprising adders positioned between the tunable electrical filters and a data recovery logic, wherein the tunable electrical filters comprise tunable edge filters or tunable bandpass filters.

10. The OLT of claim 9, wherein the tunable electrical filters are implemented in a cascading arrangement.

11. The OLT of claim 7, wherein the first PBS is configured to divide the upstream traffic into a first polarization component and a second polarization component, wherein the first polarization component is mixed by the first coupler with the first portion of the reference signal, and wherein the second polarization component is mixed by the second coupler with the second portion of the reference signal.

12. The OLT of claim 11, wherein the first polarization component and the second polarization component are separately converted into an electrical domain prior to passing through the tunable electrical filters.

13. The OLT of claim 12, wherein the first polarization component and the second polarization component are recombined after passing through the tunable electrical filters and forwarded for further signal processing.

14. The OLT of claim 6, wherein the upstream traffic comprises a connection setup portion and an operational portion, wherein the connection setup portion contains no customer data traffic and the operational portion contains customer data traffic, and wherein the tunable electrical filters may be coarsely adjusted during the operation portion.

15. A method for managing upstream traffic in a passive optical network (PON), the method comprising:
- monitoring, by a processor, frequencies in use for upstream traffic in the PON, wherein the frequencies are used for sending the upstream traffic from a plurality of optical network units (ONUs) to one optical line terminal (OLT);
- splitting, by a first polarization beam splitter (PBS), the upstream traffic;
- generating, by a tunable laser, a reference signal;
- splitting, by a second PBS directly coupled to the tunable laser, the reference signal;
- mixing the upstream traffic with the reference signal at the OLT prior to passing through tunable electrical filters;
- dividing the upstream traffic into multiple channels using the tunable electrical filters, wherein each of the tunable electrical filters corresponds to a different passband of multiple passbands and each of the tunable electrical filters is configured to pass traffic, the frequency of which falls into the corresponding passband;
- sending, by the tunable electrical filters, the divided upstream traffic to multiple receivers through the multiple channels, wherein each receiver corresponds to one channel of the multiple channels; and
- dynamically adjusting the tunable electrical filters so that each channel has approximately a same number of frequencies assigned thereto,
- wherein each channel comprises a range of frequencies, and
- wherein the ranges of frequencies do not overlap.

16. The method of claim 15, wherein the monitoring comprises detecting a random distribution of frequencies for the upstream traffic.

17. The method of claim 15, wherein dividing the upstream traffic into multiple channels comprises dynamically selecting the channels to provide load balancing based on bandwidth demand.

18. The method of claim 15, wherein dividing the upstream traffic into multiple channels using tunable electrical filters comprises controlling tunable edge filters or tunable bandpass filters.

19. The method of claim 15, further comprising accounting for increased numbers of tunable electrical filters.

20. The method of claim 15, wherein the tunable electrical filters are dynamically adjusted during an operation portion, wherein the upstream traffic comprises a connection setup portion and an operational portion, wherein the connection setup portion contains no customer data traffic, and wherein the operation portion contains customer data traffic.

* * * * *